United States Patent
Ahmed et al.

(10) Patent No.: US 12,503,578 B2
(45) Date of Patent: Dec. 23, 2025

(54) SYNDIOTACTIC POLYBUTADIENE IN NON-TIRE APPLICATIONS

(71) Applicant: Bridgestone Americas Tire Operations, LLC, Nashville, TN (US)

(72) Inventors: Shammi Ahmed, Copley, OH (US); Yingyi Huang, Hudson, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 702 days.

(21) Appl. No.: 17/753,333

(22) PCT Filed: Aug. 28, 2020

(86) PCT No.: PCT/US2020/048483
§ 371 (c)(1),
(2) Date: Feb. 28, 2022

(87) PCT Pub. No.: WO2021/041867
PCT Pub. Date: Mar. 4, 2021

(65) Prior Publication Data
US 2022/0298334 A1  Sep. 22, 2022

Related U.S. Application Data

(60) Provisional application No. 62/892,840, filed on Aug. 28, 2019, provisional application No. 62/892,737, filed on Aug. 28, 2019, provisional application No. 62/892,746, filed on Aug. 28, 2019.

(51) Int. Cl.
*C08L 9/00* (2006.01)
*B29D 22/02* (2006.01)

(52) U.S. Cl.
CPC ............. *C08L 9/00* (2013.01); *B29D 22/023* (2013.01)

(58) Field of Classification Search
CPC ................................ C08L 9/00; B29D 22/023
See application file for complete search history.

(56) References Cited

U.S. PATENT DOCUMENTS

| | | | |
|---|---|---|---|
| 9,914,821 B1 | 3/2018 | Nieten et al. | |
| 2009/0318585 A1* | 12/2009 | Sakai | B60C 1/00 523/157 |
| 2010/0036038 A1* | 2/2010 | Rodgers | C08L 21/00 525/213 |
| 2011/0210486 A1 | 9/2011 | Agarwal et al. | |
| 2016/0304707 A1 | 10/2016 | McCauley et al. | |
| 2018/0105681 A1 | 4/2018 | Pille-Wolf et al. | |

FOREIGN PATENT DOCUMENTS

| | | | | |
|---|---|---|---|---|
| EP | 825227 A1 * | 2/1998 | ................ | C08J 3/28 |
| WO | 2019089788 A1 | 5/2019 | | |

* cited by examiner

*Primary Examiner* — Catherine S Branch
*Assistant Examiner* — Andrea Wu
(74) *Attorney, Agent, or Firm* — Meredith E. Hooker; Gregory Chrisman

(57) ABSTRACT

An air spring bellow formed from a rubber composition including a rubber component that contains a polyisoprene rubber and syndiotactic 1,2-polybutadiene. The syndiotactic 1,2-polybutadiene has a low crystallinity of 40 percent or less and the rubber composition includes a filler.

19 Claims, No Drawings

SYNDIOTACTIC POLYBUTADIENE IN NON-TIRE APPLICATIONS

This application is a National-Stage application of PCT/US2020/048483 filed on Aug. 28, 2020, which claims the benefit of U.S. Provisional Application Ser. No. 62/892,737 filed Aug. 28, 2019, U.S. Provisional Application Ser. No. 62/892,746 filed Aug. 28, 2019, and U.S. Provisional Application Ser. No. 62/892,840 filed Aug. 28, 2019, all of which are incorporated herein by reference.

TECHNICAL FIELD

The present disclosure relates to the incorporation of syndiotactic polybutadiene in rubber compositions for non-tire applications and, in particular, rubber compositions including syndiotactic 1,2-polybutadiene for use in air springs.

BACKGROUND

Air springs are used to isolate road disturbances from a vehicle or component thereof. In an air spring, a volume of gas is confined within a flexible container such as a flexible rubber bladder that is fiber reinforced. As the air spring is compressed, the gas pressure is increased and then subsequently decreased as the air spring extends or becomes uncompressed. The air springs are exposed to many compression cycles and thus the gas enclosure container should be flexible and durable. In use, the air springs are exposed to high operating temperatures and abrasive environments. These conditions place higher demands on the air springs, especially the bellows that are exposed to surrounding equipment and environment such as an engine.

There exists a need among air spring manufacturers for flexible containers that can withstand the harsh conditions encountered during operation. It is also desirable that the flexible containers of air springs have high durability, for instance, with improved crack or fatigue resistance. The present invention employs a combination of materials to improve the overall durability of flexible containers for anti-vibration applications, such as use in a bellow for an air spring.

SUMMARY

In a first aspect, disclosed is an air spring bellow formed from a rubber composition having a rubber component, the rubber composition includes a rubber that is polyisoprene rubber, neoprene rubber or a combination thereof, and about 2 to about 50 parts by mass of syndiotactic 1,2-polybutadiene per 100 parts by mass of the rubber component, the syndiotactic 1,2-polybutadiene having a crystallinity in the range of about 3 to about 40 percent, a melting point in the range of about 90° to about 180° C., or about 100° to about 160° C., or a combination thereof.

In an example of aspect 1, the crystallinity of the syndiotactic 1,2-polybutadiene is in the range of about 5 to about 30 percent, or about 30 percent or less.

In another example of aspect 1, the syndiotactic 1,2-polybutadiene has a weight average molecular weight in the range of about 100,000 to about 850,000, or about 100,00 to about 500,000.

In another example of aspect 1, the the syndiotactic 1,2-polybutadiene has a weight average molecular weight of about 650,000 or less, about 500,000 or less, or about 450,000 or less.

In another example of aspect 1, the syndiotactic 1,2-polybutadiene has a 1,2-bond content of about 60 percent or more, about 70 percent or more, about 80 percent or more, or about 90 percent or more.

In another example of aspect 1, the syndiotactic 1,2-polybutadiene is present at about 30 parts or less by mass per 100 parts by mass of the rubber component.

In another example of aspect 1, the polyisoprene rubber is natural rubber.

In another example of aspect 1, the neoprene rubber is polychloroprene.

In another example of aspect 1, the polyisoprene rubber, neoprene rubber or a combination thereof includes about 20 to about 80 parts by mass per 100 parts by mass of the rubber component.

In another example of aspect 1, the rubber composition includes carbon black, clay, silica or a combination thereof as a filler.

In another example of aspect 1, the filler is clay, for example, a hydrated aluminum silicate.

In another example of aspect 1, the rubber composition includes about 5 to about 50 parts by mass of clay per 100 parts by mass of the rubber component.

In another example of aspect 1, the rubber composition includes about 10 to about 85, or about 10 to about 65 parts by mass of carbon black per 100 parts by mass of the rubber component.

In another example of aspect 1, the rubber composition includes a third component, polybutadiene rubber, for example, at about 20 to about 80 parts by mass of polybutadiene rubber per 100 parts by mass of the rubber component.

In another example of aspect 1, the rubber composition is obtained by vulcanizing the rubber composition at a temperature of about 1° to about 30° C., or about 1° to about 20° C., above the melting point of the syndiotactic 1,2-polybutadiene, the syndiotactic 1,2-polybutadiene having a melting point in the range of about 90° to about 180° C., or about 100° to about 160° C.

In another example of aspect 1, the rubber composition is vulcanized at a temperature of about 15° to about 45° C., or about 20° to about 40° C. above the melting point of the syndiotactic 1,2-polybutadiene, the syndiotactic 1,2-polybutadiene having a melting point in the range of about 90° to about 180° C., or about 100° to about 160° C.

In a second aspect, there is an air spring bellow formed from a rubber composition having a rubber component, the rubber composition including about 20 to about 120 parts by mass of polyisoprene rubber per 100 parts by mass of the rubber component; about 2 to about 50 parts by mass of syndiotactic 1,2-polybutadiene per 100 parts by mass of the rubber component, the syndiotactic 1,2-polybutadiene having a crystallinity in the range of about 3 to about 40 percent and a melting point in the range of about 90° to about 180° C., or about 100° to about 160° C.; and a clay filler.

In another example of aspect 2, the clay filler is a hydrated aluminum silicate.

In a third aspect, disclosed is a method of preparing an air spring bellow, the method includes forming a vulcanizable composition including a polyisoprene or neoprene rubber, a syndiotactic 1,2-polybutadiene having a melting point in the range of about 90° to about 160° C. or a crystallinity in the range of about 3 to about 40 percent, a sulfur-based curative, zinc oxide, and an eutectic composition; and heating the vulcanizable composition thereby effect vulcanization to form a rubber composition.

In an example of aspect 3, the rubber composition is the rubber composition of aspect 1.

In an example of aspect 3, the vulcanizable composition includes less than 2 parts by mass of the zinc oxide per 100 parts by mass of the rubber component.

In another example of aspect 3, the vulcanizable composition includes less than 1 parts by mass of the zinc oxide per 100 parts by mass of the rubber component.

In another example of aspect 3, the eutectic composition is formed by combining choline chloride and urea.

In another example of aspect 3, the vulcanizable composition includes from about 0.005 to about 3 parts by mass of the eutectic composition per 100 parts by mass of the rubber component.

In another example of aspect 3, the vulcanizable composition includes from about 0.01 to about 1 parts by mass of the eutectic composition per 100 parts by mass of the rubber component.

In a sixth aspect, disclosed are anti-vibration components and air spring bellows made by any of the above methods.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims. It is to be understood that both the foregoing general description and the following detailed description are merely exemplary, and are intended to provide an overview or framework to understanding the nature and character of the claims.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more or less than 25. In an example, such a range defines independently 5 or more, and separately and independently, 25 or less.

The present disclosure relates to rubber compositions that are useful for manufacturing flexible anti-vibration components, for example, an air spring bellow. The rubber compositions include syndiotactic 1,2-polybutadiene. In one or more embodiments, the air bellows are manufactured from rubber compositions that include a blend of polyisoprene rubber and syndiotactic 1,2-polybutadiene, neoprene rubber and syndiotactic 1,2-polybutadiene, or polyisoprene rubber, neoprene rubber and syndiotactic 1,2-polybutadiene. Blends of polyisoprene rubber, neoprene rubber and syndiotactic 1,2-polybutadiene can provide air spring bellows that have improved properties, for example, crack and fatigue resistance as compared to the same rubber compositions without the syndiotactic 1,2-polybutadiene addition. The syndiotactic 1,2-polybutadiene addition to rubber compositions for forming flexible anti-vibration components (e.g., an air spring bellow) provides minimal variation (i.e. less than 25%) in composition viscosity and scorch time as compared to the same compositions without the syndiotactic 1,2-polybutadiene addition, which results in the rubber compositions of the present invention having suitable processability for manufacturing the anti-vibration components.

The syndiotactic 1,2-polybutadiene addition to rubber compositions for forming flexible anti-vibration components further results in similar, and in some cases improved, tensile properties (stress, strain), in both aged and unaged samples, as compared to the same compositions without the syndiotactic 1,2-polybutadiene addition, which evidences that the rubber compositions of the present invention possess suitable flexibility for use in anti-vibration components. The use of syndiotactic 1,2-polybutadiene in rubber compositions for forming flexible anti-vibration components also results in compositions showing similar or improved viscoelastic properties, which further suggests the rubber compositions provide suitable flexibility for use in anti-vibration components.

Although the present disclosure is described in the context of an air sleeve and an air spring used in the suspension of an automobile, one of skill in the art will appreciate that the teachings disclosed are general and the invention may be applied to other art relating to the air spring areas. For example, the other areas can include air springs for seats, air springs used to support truck cabs, air springs used with buses, and the like.

Bellow Rubber Composition

In one or more embodiments, at least one layer of an air spring bellow (e.g., innerliner, first ply, second ply, and/or cover) are fabricated from a vulcanizable rubber composition that includes a rubber component that includes syndiotactic 1,2-polybutadiene, and a polyisoprene rubber (i.e. complementary rubber), a filler, and a cure system. Other ingredients that may be included in the vulcanizable rubber composition include plasticizers, antioxidants, fillers, oils, curatives, and other additives that are conventionally employed in rubber compositions. The term vulcanization is not limited to sulfur cross-linking, but also encompasses non-sulfur cross-linking such as peroxide cross-linking. The vulcanization temperature generally refers to the maximum temperature reached after vulcanization has progressed from the start of vulcanization, which is usually the set temperature of the vulcanizing apparatus.

Rubber Component

The rubber component of the vulcanized rubber composition can include polyisoprene rubber. The polyisoprene rubber is selected from one or more types of natural rubber and synthetic polyisoprene rubber. Examples of the isoprene-based rubber include isoprene rubber, natural rubber, modified natural rubbers, rubber from hevea, guayule and taraxacum kok-saghyz (TKS) or Russian dandelion. Examples of natural rubber include deproteinized natural rubber and high purity natural rubber. Examples of modified natural rubbers include epoxidized natural rubber, hydrogenated natural rubber, and grafted natural rubber. Among these isoprene-based rubbers, natural rubber is preferred in terms of achieving the effects of the invention more effectively.

In one or more embodiments, the rubber component can contain polyisoprene rubber in an amount from about 20 to about 120 parts, about 30 to about 100 parts, about 40 to about 80 parts, or about 50, about 60 or about 70 parts by mass per 100 parts by mass of the rubber component. In one or more embodiments, the rubber component can include about 10 percent or more, about 20 percent or more, about 30 percent or more, about 40 percent or more, about 50 percent or more, about 60 percent or more, or about 70 percent or more by mass of polyisoprene rubber.

In other embodiments, the rubber component of the vulcanized rubber composition can include neoprene rubber in an amount from about 20 to about 120 parts, about 30 to about 100 parts, about 40 to about 80 parts, or about 50, about 60 or about 70 parts by mass per 100 parts by mass of the rubber component. In one or more embodiments, the rubber component can include about 10 percent or more, about 20 percent or more, about 30 percent or more, about 40 percent or more, about 50 percent or more, about 60 percent or more, or about 70 percent or more by mass of neoprene rubber. In yet other embodiments, the rubber component can include both polyisoprene and neoprene in the above amounts.

In particular embodiments, the rubber includes polymers that derive from the polymerization of halogenated dienes and optionally monomer copolymerizable therewith. A useful halogenated diene is 2-chloro-1,3-butadiene, which is also known as chloroprene. Monomer copolymerizable with chloroprene includes sulfur and 2,3-dichloro-1,3-butadiene. Homopolymers of chloroprene are generally referred to as polychloroprene. For purposes of this description, the rubbers deriving from the copolymerization of chloroprene and monomer copolymerizable therewith may be referred to as polychloroprene copolymers.

In one or more embodiments, polychloroprene or polychloroprene copolymers employed in the rubber component as a neoprene rubber may be characterized by a Mooney viscosity ($ML_{1+4}$ at 100° C.) of at least 25, in other embodiments at least 40, in other embodiments at least 60, in other embodiments at least 80, and in other embodiments at least 100. In these or other embodiments, the polychloroprene or polychloroprene copolymers may be characterized by a Mooney viscosity ($ML_{1+4}$ at 100° C.) of less than 150, in other embodiments less than 130, in other embodiments less than 110 in other embodiments less than 80, in other embodiments less than 60, and in other embodiments less than 50. In particular embodiments, the polychloroprene or polychloroprene copolymers may be characterized by a Mooney viscosity ($ML_{1+4}$ at 100° C.) of from about 100 to about 120, and in other embodiments from about 41 to about 51.

In one or more embodiments, blends of distinct polychloroprene or polychloroprene copolymers may be employed to achieve a desirable balance of properties. These distinctions may be based upon comonomer content and/or viscosity of the polymers.

Some examples of polychloroprene or polychloroprene copolymers are available from DuPont Performance Elastomers (Wilmington, Del.) under the Neoprene™ "WD" and "WRT" family designations.

In addition to the polyisoprene or neoprene rubber and sydiotactive 1,2-polybutadiene, the rubber component of the rubber composition can include a third rubber, for example, a conjugated diene rubber.

The additional rubber (e.g., a conjugated diene rubber) can be present in the rubber component in an amount from about 10 to about 120 parts, about 20 to about 100 parts, about 30 to about 80 parts, or about 40, about 50, about 60 or about 70 parts by mass per 100 parts by mass of the rubber component. In one or more embodiments, the rubber component can include about 10 percent or more, about 20 percent or more, about 30 percent or more, about 40 percent or more, about 50 percent or more, about 60 percent or more, or about 70 percent or more by mass of the additional rubber (e.g., conjugated diene rubber).

Conjugated diene-based rubbers as the additional rubber compound can include styrene-butadiene copolymer rubber (SBR), polybutadiene rubber (BR), acrylonitrile-butadiene copolymer rubber (NBR), butyl rubber (IIR), halogenated butyl rubber (Cl-IIR, such as Br-IIR), ethylene-propylene-diene terpolymer rubber (EPDM), ethylene-butadiene copolymer rubber, propylene-butadiene copolymer rubber, and combinations thereof. Other rubbers can include polyisobutylene-co-isoprene, polychloroprene, poly(ethylene-co-propylene), poly(styrene-co-isoprene), and poly(styrene-co-isoprene-co-butadiene), poly(isoprene-co-butadiene), poly(ethylene-co-propylene-co-diene), neoprene, polysulfide rubber, acrylic rubber, urethane rubber, nitrile rubber, silicone rubber, epichlorohydrin rubber, and mixtures thereof.

Syndiotactic 1,2-Polybutadiene

The rubber component can contain syndiotactic 1,2-polybutadiene in an amount from about 1 to about 50 parts, about 5 to about 40 parts, about 8 to about 35 parts, about 10 to about 30 parts, or about 15, about 20 or about 25 parts by mass per 100 parts by mass of the rubber component. In one or more embodiments, the rubber component can include about 50 percent or less, about 40 percent or less, about 35 percent or less, about 30 percent or less, or about 25 percent or less by mass of syndiotactic 1,2-polybutadiene.

The melting point temperature of the syndiotactic 1,2-polybutadiene can be in the range of about 100 to about 160° C., about 100 to about 150° C., about 100 to about 140° C., or about 105 to about 130° C. In one or more embodiments, the melting point temperature of the syndiotactic 1,2-polybutadiene can be about 160° C. or less, about 150° C. or less, about 140° C. or less, or about 130° C. or less.

Syndiotactic 1,2-polybutadiene according to the present invention can be obtained by polymerizing 1,3-butadiene monomer in an organic solvent including an aliphatic solvent with an iron-based catalyst composition. Examples processes for preparing the syndiotactic 1,2-polybutadiene can be found in Japanese Publication Nos. 2000-119325; 2004-5284110; 2005-527641; 2009-108330; 7-25212; 6-306207; and 6-199103. Examples of the iron-based catalyst composition include: (a) an iron-containing compound; (b) an α-acylphosphonic acid diester; and (c) a catalyst composition comprising a mixture of an organoaluminum compound; (a) an iron-containing compound; (b) an α-acylphosphonic acid diester; (c) an organoaluminum compound; and other organometallic compounds or Lewis bases; or (a) a catalyst composition including an iron-containing compound; (b) a dihydrocarbyl hydrogen phosphite; and (c) an organoaluminum compound. Examples of the cobalt-based catalyst composition include a catalyst system composed of soluble cobalt, e.g., cobalt octoate, cobalt 1-naphthalate, cobalt benzoate, and the like, an organoaluminum compound, e.g., trimethylaluminum, triethylaluminum, tributylaluminum, triphenylaluminum, and the like, and carbon dioxide.

The syndiotactic 1,2-polybutadiene of the rubber component can have a 1,2-bond content of about 60 percent or more by mass, about 70 percent or more by mass, about 80 percent or more by mass, about 85 percent or more by mass, or about 90 percent or more by mass of the total content of syndiotactic 1,2-polybutadiene in the rubber component. In the 1,2-bond content of the syndiotactic 1,2-polybutadiene, the syndiotacticity can be about 60 percent or more by mass, about 70 percent or more by mass, about 80 percent or more by mass, about 85 percent or more by mass, or about 90 percent or more by mass. The syndiotacticity represents the content of syndiotactic structures in 1,2-bonds. Syndiotacticity during 1,2-binding can be determined by $^1$H and $^{13}$C nuclear magnetic resonance (NMR) analyses of syndiotactic 1,2-polybutadienes.

The weight average molecular weight of the syndiotactic 1,2-polybutadiene can be in the range of from about 100,000 to about 850,000, about 150,000 to about 825,000, about 200,000 to about 800,000, or about 250,000 to about 750,000. In one or more embodiments, the weight average molecular weight of the syndiotactic 1,2-polybutadiene can be about 850,000 or less, about 800,000 or less, about 750,000 or less, about 700,000 or less, about 650,000 or less, about 500,000 or less, or about 450,000 or less. In other embodiments, the weight average molecular weight of the syndiotactic 1,2-polybutadiene can be in the range of from about 100,000 to about 550,000, about 150,000 to about 500,000, or about 200,000 to about 450,000. The weight average molecular weight of the syndiotactic 1,2-polybutadiene is measured in accordance with ASTM 6474 by gel permeation chromatography (GPC).

The degree of crystallinity in the syndiotactic 1,2-polybutadiene can be in the range of about 3 to about 40 percent, about 5 to about 35 percent, about 8 to about 32 percent or about 10 to about 30 percent. In one or more embodiments, the degree of crystallinity in the syndiotactic 1,2-polybutadiene can be about 40 percent or less, about 35 percent or less, about 30 percent or less, or about 25 percent or less. The crystallization degree of the syndiotactic 1,2-polybutadiene is measured in accordance with ASTM D3418 using a differential scanning calorimeter (DSC).

In one or more embodiments, by containing 2 parts by mass or more of syndiotactic 1,2-polybutadiene, a double network of a rubber component containing polyisoprene rubber and syndiotactic 1,2-polybutadiene can be formed to improve fatigue resistance as compared to the same rubber composition without the added syndiotactic 1,2-polybutadiene.

Filler

The vulcanized rubber composition produced in the present invention may contain a filler. The filler may contain an inorganic filler or an organic filler other than carbon black or carbon black. One type of filler or a combination of two or more types may be used. For example, the rubber composition can include two or more fillers (e.g., clay and carbon black, or clay, carbon black and silica).

In one or more embodiments, the filler can be clay, for example, a hydrated aluminum silicate. The rubber component can contain clay in an amount from about 1 to about 50 parts, about 5 to about 45 parts, about 8 to about 40 parts, about 10 to about 35 parts, or about 15, about 20, about 25, or about 30 parts by mass per 100 parts by mass of the rubber component. In one or more embodiments, the clay filler can be present in the rubber composition in an amount of about 40 percent or less, about 30 percent or less, about 25 percent or less, about 20 percent or less, or about 15 percent or less by mass of the total mass of the rubber composition.

In one or more embodiments, the rubber compositions can include carbon black. Carbon black is virtually pure elemental carbon in the form of colloidal particles that are produced by incomplete combustion or thermal decomposition of gaseous or liquid hydrocarbons under controlled conditions. Carbon black may be added to the rubber compositions as a reinforcing filler to achieve the required balance of processability, hardness and tensile or tear properties.

The carbon black contained in the vulcanized rubber composition is not particularly limited, and, for example, SAF, ISAF, a IISAF, a N339, HAF, FEF, or GPF-grade carbon black is used, and the nitrogen-adsorption specific surface area can be 20 to 160 m$^2$ per gram, 25 to 160 m$^2$ per gram, 25 to 150 m$^2$ per gram, or 30 to 150 m$^2$ per gram. The dibutyl phthalate oil absorption (measured according to DBP, JIS K 6217-4: 2008) can be 40 to 160 ml/100 g, 40 to 150 ml/100 g, 50 to 150 ml/100 g, 60 to 150 ml/100 g, or 60 to 140 ml/100 g. One type of carbon black or a combination of two or more types may be used.

The rubber component can contain carbon black in an amount from about 10 to about 85 parts, about 15 to about 70 parts, about 20 to about 55 parts, or about 25 parts to about 50 parts by mass per 100 parts by mass of the rubber component.

In one or more embodiments, the total filler content present in the rubber composition can be in an amount of about 60 percent or less, about 55 percent or less, about 50 percent or less, about 45 percent or less, or about 40 percent or less by mass of the total mass of the rubber composition. In some other embodiments, the total filler content can be in an amount from about 20 to about 100 parts, about 30 to about 90 parts, about 40 to about 85 parts, or about 50 parts to about 80 parts by mass per 100 parts by mass of the rubber component.

As the inorganic filler other than carbon black contained in the vulcanized rubber composition according to the present invention, silica is preferable. Examples of the silica include wet silica (hydrous silicic acid), dry silica (anhydrous silicic acid), calcium silicate, and the like. Preferably, the BET specific surface area (measured based on ISO 5794/1) of the wet silica is between 40 and 350 mg$^2$ per g. Silica having a BET specific surface area in this range has an advantage that both rubber reinforcement and dispersibility in a rubber component can be achieved.

The rubber compositions of the invention may optionally contain, in addition to the above ingredients, typical compounding agents used for producing a rubber composition, e.g., zinc oxide, stearic acid, antioxidants, antidegradants, tackifiers, coupling agents, wax, vulcanizing agents such as sulfur, and vulcanization accelerators.

In one or more embodiments, the rubber compositions may include one or more antioxidants. Useful antioxidants include bisphenol type antioxidants, diphenylamines, and zinc salts. Useful bisphenol-type antioxidants are available under the tradename Vulakanox BFK (LANXESS). Useful diphenylamine antioxidants are available under the tradename 405 (Akrochem). Useful zinc salt antioxidants are available under the tradename 58 (Akrochem).

The vulcanizable rubber compositions, in some embodiments, may include one or more antidegradants. Antidegradant protect the final product vulcanizate against damaging external influences such as oxidation, ozone, heat, and dynamic stresses. Example antidegradants can include Vulkanox MB2, also known as 4- and 5-methyl-2-mercaptobenzimidazole, Wingstay 100, which is a mixed diaryl-p-phenylene type antidegradant, IPPD, or N-isopropyl-N'-phenyl-p-phenylenediamine, 6PPD, or N-(1,3-dimethylbutyl)-N-phenyl-p-phenylenediamine.

The rubber compositions, in one or more embodiments, can include low oil swell factices, or vulcanized oils. In specific embodiments, these compounds include sulfur vulcanized vegetable oils. These factices decrease compound nerve and may permit higher liquid plasticizer levels. Factices may also speed the incorporation of fillers and increase milling efficiency. A suitable factice is commercially available from Akrochem Corporation (Akron, Ohio) under the Akrofax tradename.

In other embodiments, the rubber composition can include a coupling agent for non-black fillers, for example, a clay coupling agent. Exemplary coupling agents include include silane coupling agents, and specifically Struktol SCA 985.

In one or more embodiments, plasticizers for use in the rubber compositions, which may also be referred to as softeners, can include fatty acids, vegetable oils, petroleum products, coal tar products, pine products, esters, and resins. In some embodiments, the plasticizers can include esters, for example, dicapryilphthalate, butylcuminate, dibutylphthalate, butyllactate, glycerol chlorobenzoate, methylricinoleate, octyloleate, dioctylphthalate, or dioctylsebacate.

The rubber compositions can also include a tackifier or tackifier resin for increasing the tackiness of the composition. Natural or synthetic resins may be employed, for example, a nitrile rubber latex can be used. In other examples the tackifier may include Koresin (BASF), which is believed to be a resin of acetylene and p-t-butylphenol.

In one or more embodiments, the rubber compositions can include wax as a processing aid and release agent. An example wax can include a low viscosity polyethylene wax, which is available from Akrochem Corporation (Akron, Ohio) under the PE-100 tradename.

In one or more embodiments, the rubber compositions contain a vulcanization accelerator, for example, in an amount of about 0.5 to about 3.5 parts by mass per 100 parts by mass of the rubber component. The vulcanization accelerator can be part of a cure package. Examples of the vulcanization accelerator include sulfenamide, thiazole, thiuram, thiourea, guanidine, dithiocarbamic acid, aldehydeamine, aldehyde-ammonia, imidazoline, and xanthate vulcanization accelerators. These vulcanization accelerators may be used alone, or two or more of these may be used in combination. Examples of the sulfenamide vulcanization accelerator include N-tert-butyl-2-benzothiazolylsulfenamide, N-cyclohexyl-2-benzothiazolylsulfenamide, and N,N-dicyclohexyl-2-benzothiazolylsulfenamide.

In one or more embodiments, the rubber compositions can include a curative, or cure package. The cure package can include a sulfur-based compound and may also include other optional ingredients (e.g., a vulcanization accelerator). Sulfurs that are soluble or insoluble in elastomers may be used, for example, Crystex OT 20, available from Flexsys (Akron, Ohio), is a polymeric sulfur that is insoluble in elastomers. TMTD, or tetramethylthiuram disulfide, is a cure accelerant that increases the rate of cure by catalyzing the addition of sulfur chains to the rubber molecules. Zinc oxide acts as a cure activator in the presence of sulfur, one or more accelerators, and unsaturated rubber to help promote the formation of sulfur cross-links during the vulcanization process.

In one or more embodiments, the vulcanizable rubber compositions can include an eutectic composition. An eutectic composition includes those compositions formed by combining two or more compounds that provide a resultant combination that has a melting point lower than each of the respective compounds that are combined.

In one or more embodiments, useful eutectic composition includes a combination of an acid and a base, where the acid and base may include Lewis acids and bases or Bronsted acids and bases. In one or more embodiments, useful eutectic compositions include a combination of a quaternary ammonium salt with a metal halide (which are referred to as Type I eutectic composition), a combination of a quaternary ammonium salt and a metal halide hydrate (which are referred to as Type II eutectic composition), a combination of a quaternary ammonium salt and a hydrogen bond donor (which are referred to as Type III eutectic composition), or a combination of a metal halide hydrate and a hydrogen bond donor (which are referred to as Type IV eutectic composition). Analogous combinations of sulfonium or phosphonium in lieu of ammonium compounds can also be employed and can be readily envisaged by those having skill in the art. In one or more embodiments, the eutectic composition is formed by combining choline chloride and urea, which can be added to the other components to form the rubber composition.

Eutectic compositions useful in air-spring bellow compositions are described in U.S. Appln. No. 62/840,546, which is incorporated herein by reference. Eutectic compositions can be obtained commercially. For example, eutectic solvents are commercially available under the tradenames Ionic Liquids from Scionix. Useful eutectic compositions are also generally known as described in U.S. Publ. Nos. 2004/0097755 A1 and 2011/0207633 A1, which are incorporated herein by reference.

In one or more embodiments, the vulcanizable compositions or rubber compositions include from about 0.005 to about 3, in other embodiments from about 0.01 to about 1, and in other embodiments from about 0.02 to about 0.1 parts by mass of the eutectic composition per 100 parts by mass of the rubber component. In one or more embodiments, the amount of eutectic solvent can be described with reference to the loading of metal activator (such as zinc oxide). In one or more embodiments, the vulcanizable compositions include from about 2 to about 15, in other embodiments from about 3 to about 12, and in other embodiments from about 5 to about 10 wt % eutectic solvent based upon the total weight of the eutectic solvent and the metal activator (e.g. zinc oxide) present within the vulcanizable composition.

Examples of the vulcanizing agent for the cure package include sulfur (powdered sulfur, etc.), morpholine disulfide, sulfur-containing vulcanizing agent such as a polymer polysulfide, etc. in the case of sulfur crosslinking. Non-sulfur bridges include peroxide bridges such as tert-butyl hydroperoxide, 1,1,3,3-tetramethylbutyl hydroperoxide, cumene hydroperoxide, dicumyl peroxide, di-tert-butyl peroxide, diisopropylbenzene hydroperoxide, tert-butyl cumyl peroxide, and the like.

In one or more embodiments, the rubber compositions can include stearic acid. Stearic acid (octadecanoic acid) is a waxy solid and has the chemical formula $C_{18}H_{36}O_2$. Stearic acid is particularly effective as a processing aid in minimizing mill and calendar roll sticking.

In one or more embodiments, the rubber compositions can include magnesium oxide (MgO). Magnesium oxide may neutralize trace hydrogen chloride that may be liberated by the polymer during processing, vulcanization heat aging or service. By removing the hydrogen chloride, magnesium oxide can prevent auto-catalytic decomposition resulting in greater stability. Magnesium oxide may also take part in the crosslinking process.

With regard to the non-rubber component ingredients and filler, those skilled in the art will be able to select an appropriate amount of the various ingredients that can be used based upon the ultimate desired properties sought within the airsleeve of an air spring. Likewise, those skilled in the art will be able to select an appropriate amount of curative and complementary cure agents in order to achieve a desired level of cure.

The compositions for preparing one or more layers of air sleeve or bellow can be prepared by conventional means using conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers used, and the fillers, processing oils, waxes, and other ingredients used. In one or more embodiments, the ingredients can be added together in a single stage. In other embodiments, some of the ingredients fillers can be first loaded followed by the rubber component. In other embodiments, a more conventional manner can be employed where the rubber component is added first followed by the other ingredients. In even other embodiments, the rubber may be added at the same time as the syndiotactic 1,2-polybutadiene.

Mixing cycles generally range from about 2 to 10 minutes. In certain embodiments an incremental procedure can be used whereby the rubber component and part of the ingredients are added first, and the remaining ingredients are added in additional increments. In other embodiments, part of the rubber component can be added on top of the other ingredients. In other embodiments, the rubber and syndiotactic 1,2-polybutadiene are added together. In one or more embodiments, two-stage mixing can be employed.

The syndiotactic 1,2-polybutadiene can be added with the rubber compounds near the beginning of the mixing cycle. (e.g., in the masterbatch). In one or more embodiments, the syndiotactic 1,2-polybutadiene is added before the cure package is added. In other embodiments, it can be added with the cure package during final mix. When utilizing an internal mixer, the dry or powdery materials such as the carbon black can be added first, followed by the processing aids and finally the rubber to form the masterbatch. The cure package (sulfur, accelerants, antidegradants, etc.) can be added near the end of the mixing cycle and at lower temperatures to prevent premature crosslinking of the rubber.

In one or more embodiments, the methods of producing a vulcanized rubber composition include vulcanizing the rubber composition. Vulcanizing the rubber composition can be completed at a temperature in the range of about 1° to about 30° C., about 1° to about 20° C., or about 3° to 18° C., above the melting point temperature of the syndiotactic 1,2-polybutadiene present in the rubber composition. In another example, the rubber composition can be vulcanized at a temperature of about 15° to about 45° C., or about 20° to about 40° C. above the melting point of the syndiotactic 1,2-polybutadiene present in the rubber composition.

Vulcanization can be carried out at a temperature in the range of about 140° to about 170° C., or about 150° to about 160° C.

Once mixed, the rubber compositions can be then formed into a sheet via calendaring or combined with a reinforcing cord-(fabric or metal) for preparation of an air spring bellow. The compositions of the invention can also be formed into various types of articles using other techniques such as extrusion. The vulcanizable rubber compositions can be formed into air sleeves of air springs by employing conventional techniques for fabricating and manufacturing air springs. Air spring and air sleeve constructions and methods of their manufacture are known in the art as exemplified in U.S. Pat. Nos. 7,250,203, 5,527,170, and 6,439,550.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. An air spring bellow comprising a rubber composition, the rubber composition comprising a rubber component comprising:
   a. a rubber selected from the group consisting of a polyisoprene rubber and a neoprene rubber,
   b. 2 to 50 parts by mass of syndiotactic 1,2-polybutadiene per 100 parts by mass of the rubber component, the syndiotactic 1,2-polybutadiene having a crystallinity in the range of 3 to 40 percent,
   wherein the rubber composition is obtained by vulcanizing the rubber composition at a temperature of at least 140° C. and at least 1° to 30° C. above the melting point of the syndiotactic 1,2-polybutadiene, the syndiotactic 1,2-polybutadiene comprising a melting point in the range of 140° to 160° C.

2. The air spring bellow of claim 1, wherein the crystallinity of the syndiotactic 1,2-polybutadiene is in the range of −5 to 30 percent.

3. The air spring bellow of claim 1, wherein the syndiotactic 1,2-polybutadiene comprises a weight average molecular weight in the range of 100,000 to 850,000.

4. The air spring bellow of claim 1, wherein the syndiotactic 1,2-polybutadiene comprises a 1,2-bond content of 70 percent or more.

5. The air spring bellow of claim 1, wherein the syndiotactic 1,2-polybutadiene is present at 30 parts or less by mass per 100 parts by mass of the rubber component.

6. The air spring bellow of claim 1, wherein the neoprene rubber is polychloroprene.

7. The air spring bellow of claim 1, wherein the polyisoprene rubber, neoprene rubber or a combination thereof comprises 20 to 80 parts by mass per 100 parts by mass of the rubber component.

8. The air spring bellow of claim 1, wherein the rubber composition comprises a filler selected from the group consisting of carbon black, clay, silica and a combination thereof.

9. The air spring bellow of claim 1, wherein the rubber composition comprises 5 to 50 parts by mass of clay per 100 parts by mass of the rubber component.

10. The air spring bellow of claim 9, wherein the clay is a hydrated aluminum silicate.

11. The air spring bellow of claim 1, wherein the rubber composition comprises-10 to 85 parts by mass of carbon black per 100 parts by mass of the rubber component.

12. The air spring bellow of claim 1, wherein the rubber component further comprises polybutadiene rubber.

13. A method of preparing the air spring bellow of claim 1, the method comprising forming a vulcanizable composition comprising the polyisoprene rubber or the neoprene rubber, the syndiotactic 1,2-polybutadiene, a sulfur-based curative, zinc oxide, and an eutectic composition; and
   heating the vulcanizable composition to thereby effect vulcanization to form the rubber composition.

14. The method of claim 13, wherein the vulcanizable composition comprises less than about 2 parts by mass of the zinc oxide per 100 parts by mass of the rubber component.

15. The method of claim 13, wherein the vulcanizable composition comprises less than about 1 parts by mass of the zinc oxide per 100 parts by mass of the rubber component.

16. The method of claim 13, wherein the vulcanizable composition comprises from about 0.005 to about 3 parts by mass of the eutectic composition per 100 parts by mass of the rubber component.

17. The method of claim 13, wherein the vulcanizable composition comprises from about 0.01 to about 1 parts by mass of the eutectic composition per 100 parts by mass of the rubber component.

18. An air spring bellow comprising a rubber composition, the rubber composition comprising a rubber component comprising:
- a. a rubber selected from the group consisting of a polyisoprene rubber and a neoprene rubber,
- b. 2 to 50 parts by mass of syndiotactic 1,2-polybutadiene per 100 parts by mass of the rubber component, the syndiotactic 1,2-polybutadiene having a crystallinity in the range of 3 to 40 percent,
- c. 5 to 50 parts by mass of clay per 100 parts by mass of the rubber component, and
- d. 10 to 85 parts by mass of carbon black per 100 parts by mass of the rubber component, wherein the rubber composition is obtained by vulcanizing the rubber composition at a temperature of at least 140° C. and at least 1° to 30° C. above the melting point of the syndiotactic 1,2-polybutadiene, the syndiotactic 1,2-polybutadiene comprising a melting point in the range of 140° to 160° C.

19. The air spring bellow of claim 18, wherein the crystallinity of the syndiotactic 1,2-polybutadiene is in the range of −5 to 30 percent.

* * * * *